United States Patent [19]
Butler et al.

[11] Patent Number: 6,141,724
[45] Date of Patent: Oct. 31, 2000

[54] REMOTE APPLICATION DESIGN

[75] Inventors: Nicholas David Butler; Jacqueline Bowden; Steven John Hyatt, all of Romsey; David Seager Renshaw, Winchester; Yuk-Lun Wong, Romsey, all of United Kingdom

[73] Assignee: International Business Machines Corp., Armonk, N.Y.

[21] Appl. No.: 09/115,921

[22] Filed: Jul. 15, 1998

[30] Foreign Application Priority Data

Sep. 19, 1997 [GB] United Kingdom .................... 9720015

[51] Int. Cl.$^7$ ..................................................... G06F 9/445
[52] U.S. Cl. .............................................................. 711/11
[58] Field of Search ................................ 395/712; 717/11

[56] References Cited

U.S. PATENT DOCUMENTS

| | | | |
|---|---|---|---|
| 5,708,709 | 1/1998 | Rose .......................................... | 705/59 |
| 5,732,218 | 3/1998 | Bland et al. ............................. | 709/224 |
| 5,826,019 | 10/1998 | Ronstrom ................................. | 709/201 |
| 5,838,682 | 11/1998 | Dekelbaum et al. .................... | 370/401 |
| 5,878,418 | 3/1999 | Poleyn et al. ............................ | 707/10 |
| 5,973,696 | 10/1999 | Agranat et al. .......................... | 345/357 |
| 5,991,534 | 11/1999 | Hamilton et al. ........................ | 717/1 |
| 5,999,965 | 10/1998 | Kelly ........................................ | 709/202 |
| 5,999,972 | 12/1999 | Gish ......................................... | 709/219 |

FOREIGN PATENT DOCUMENTS

| | | | |
|---|---|---|---|
| 0 710 909 | 5/1996 | European Pat. Off. .......... | G06F 9/44 |
| 0 798 635 | 10/1997 | European Pat. Off. .......... | G06F 9/44 |

OTHER PUBLICATIONS

Emigh, J.; "IBM Intros Java Tools for Call Center, IVR, and SFA Apps". Newsbytes, IBM Corporation, Jun. 1996.

Business Wire; "Object share provides a complete Java application development solution with Parts for Java 2.0". Businesswire, May 1997.

Enterprise Computer Telephony Forum; "Architecture Framework: Version 1.0". Accessed online Jan. 19, 2000. Retrieved from the Internet: http://www.ectf.org/ectf/pub-docs/arch_fr.pdf, Apr. 1996.

Clark, D.; "Strategic Directions in Networks and Telecommunications". ACM Digital Library[online], ACM Computing Surveys, vol. 28, No. 4, p. 679–690, Dec. 1996.

Sun Microsystems Incorporated; "The Java Telephony API: An Overview, Version 1.1". Accessed online on Jan. 19, 2000. Retreived from the Internet: http://www.sun.com.

Shah, R.; "How Java will brong together the Internet and telephony". Java World Magazine[online]. Accessed on Jan. 19, 200. Retrieved from: http://www.javaworld.com/jw-–Feb. 1997/jw–02–api.telephony.html.

Sun Microsystems Incorporated; "JavaBeans". Accessed online on Jan. 19, 2000. Retrieved from the Internet: http://www.sun.com, Jul. 1997.

*Primary Examiner*—Tariq R. Hafiz
*Assistant Examiner*—K. Booker
*Attorney, Agent, or Firm*—Jerry W. Herndon

[57] ABSTRACT

A system for remotely developing an telephony application for a call handling server comprises: program code components for each process used by the call handling server and an associated reduced code components for each process; an application designer for combining the reduced code components into an application design; networking capability for sending the application designer and reduced code components to a client and receiving a completed application design; and an application builder for assembling, according to the application design, the program code components into an self contained application.

9 Claims, 5 Drawing Sheets

FIG. 4A

| Get DTMF Tone | -Properties |
|---|---|
| Max Tones : | 10 |
| Terminators : | # . * |
| Timeout : | 10 seconds |

FIG. 4B

| Play Audio Clip | -Properties |
|---|---|
| Name : | Say 'Hello' |

REMOTE APPLICATION DESIGN

FIELD OF INVENTION

This invention relates to designing applications remotely. More specifically it relates to designing a telephony application on a client remote from a telephony server using an internet connection.

BACKGROUND OF INVENTION

Large numbers of telephony calls are made every day to organizations and a proportion of these are intercepted by an automated call handling system. Such a system can perform an infinite variety of tasks depending on the type of organization. For instance: in a office, the system may simply put a call through to a required party; in a bank the system may ask the caller using a simulated voice for his account number and password which are recognised as DTMF tones before forwarding the call; and in a pizza restaurant the system may take a food order automatically.

An automated call handling system runs under the control of a telephony application written by an engineer for a specific purpose. In some call handling systems the telephony application may be written in a high level language which symbolizes real events and processes, this simplifies the task and allows relatively low experienced engineers to write the applications. The engineer uses a development tool with a graphical user interface (GUI) to pick and place icons representing basic telephony operations onto a graphical workspace. An icon so placed now represents a real operation to be performed by the call handling system. The operation is required to be performed according to certain properties and such properties must be associated with the operation. This is done using the GUI by selecting the icon representing the operation and requesting that a list of properties associated with that operation be displayed for editing purposes. Properties for that operation are added or amended to the list using a keyboard entry and the list and operation are deselected after completion. A number of operations may be so defined and represented on the GUI as icons. The icons represent a sequence of operations to be interpreted and performed by the call handling system.

A difficulty with known call handling systems is that a development tool for writing applications is part of the system and an engineer must use the same computer to write the application. This is somewhat restrictive since the computer is typically located in a remote part of a building or in an entirely different location to the engineer.

One possible solution is to have a dedicated machine for running a development tool but such computers are normally large servers and considerably more expensive than PCs. Problems also arise when a telephony application is created remotely and then transferred to the call handling system. There is increased risk of errors in the code since the application is not constructed by the call handling system directly but by a related tool. Also there is increased risk that errors are introduced during the transfer of the telephony application. Furthermore some development tools compile the full application without using the latest version of the code to be used on the server and the scope for the engineer introducing an unforeseen problem is increased.

It is desirable to provide a development tool that does not have the above disadvantages.

SUMMARY OF INVENTION

According to an aspect of the invention there is provided a system as claimed in claim 1. Such a system allows remote programming of telephony applications. Such a system is more efficient and is less prone to error than prior art solutions.

Preferably the component code comprises class definitions in an object orientated language (OOL). As such the component code will be representative of actual process performed in the call handling system.

Preferably the representations of component code comprises the class definitions of the component code without the method code of the component object. Such method code in the component objects is used only when the components are being executed in the call handling system. Object representations have some methods which are particular to the representations but not the object components. More preferably representations closely resemble the component code but do not comprise program code which is not needed in the application design stage.

Preferably the representations of component code comprises the class definitions of the component code comprising only the properties of the class. More preferably representations closely resemble the component code but comprise the parts of the component code which is necessary in the design.

The object representations may comprise program code which simulates program code in the component objects, in particular properties and events in the component objects can be simulated by program code in the representation. Such property and event simulation will require less program code than the equivalent event in the component object.

Preferably the object orientated language is JAVA. Any user with basic internet capability is able to use the application without any previous experience of telephony applications.

The object representations may be reduced to a string (translated from multi-dimensioned data structures to a single dimension) for transmission over the internet. This reduction is advantageous when using the limited capacity networks such as the internet.

The use of object representations avoids the client interfering with the program code of the objects.

According to another aspect of the invention there is provided a method as claimed in claim 9.

BRIEF DESCRIPTION OF DRAWINGS

In order to promote a fuller understanding of this and other aspects of the present invention, an embodiment will now be described, by way of example only, with reference to the accompanying drawings in which:

FIG. 4A and 4B shows some properties of two telephony operations;

DETAILED DESCRIPTION OF PREFERRED EMBODIMENT

Figure 1:
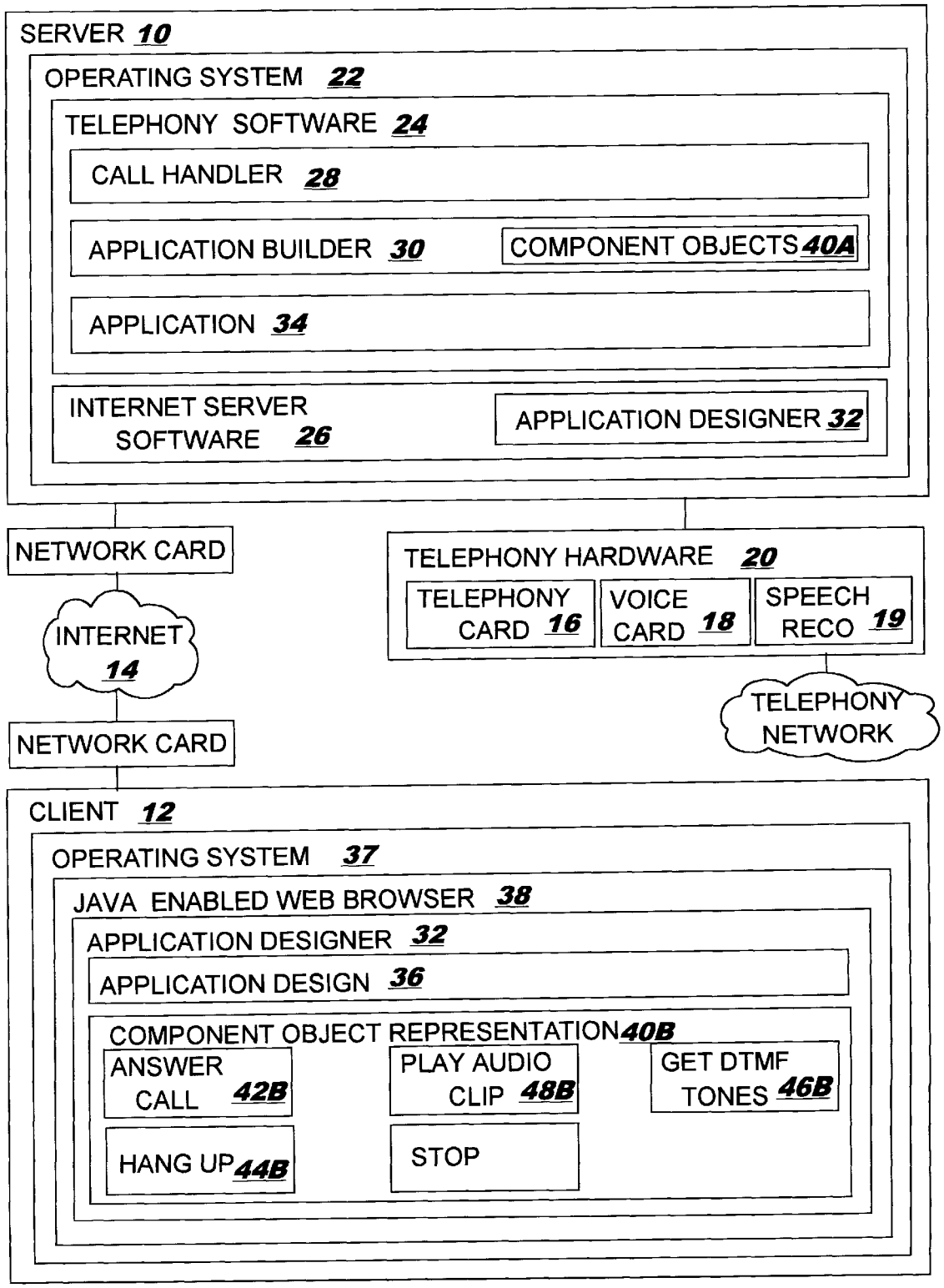
FIG. 1 is a schematic representation of the key elements of the embodiment.

Server hardware 10 is connected to client hardware 12 via a network 14 such as the internet (as shown in FIG. 1). The server 10 is, for example, an IBM RS6000 PC having an IBM RISC 6000 processor, 64M bytes of memory, a 10 G byte central hard drive, telephony card 16 connected to a single or multiple telephone lines, voice card 18, speech recognisor card 19 (all indicated by telephony hardware 20 in FIG. 1) and a network card connecting with an internet gateway. The server 10 is under the control of AIX for RS6000 operating system 22, telephony software 24 and internet server software 26.

The telephony software 24 comprises a call handler 28, an application builder 30 and an application designer 32. An application design 36 is constructed by the application designer 32 on the client and passed over the internet to the application builder 30. The application builder 30 constructs an application 34 in stand alone program code according to the application design 36 and passes this to the call handler 28 for execution.

The internet server software 26 controls communication to the client 12 on the internet 14. A web page with hypertext links to the application designer 32 in the form of a JAVA applet is stored on the server 10 and the applet is sent to a client 12 on request.

The client 12 is a personal computer such as an IBM Aptiva using a Pentium processor having 16M bytes of RAM, a 2 G byte local hard drive and a connection to the internet through a network card (alternatively a 34 kps modem connected to a telephone line could be used). The client is controlled by an OS/2 operating system 37 and runs a JAVA enabled web browser 38 such as NETSCAPE Navigator.

Figure 5A:
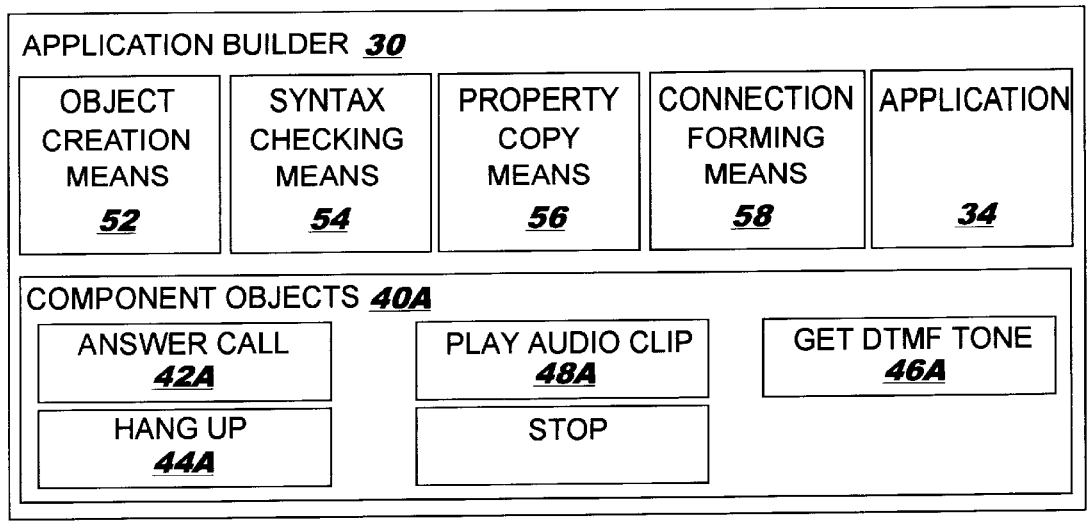
FIG. 5A is a schematic representation of an application builder.

The call handler 28 controls various operations in relation to a telephone line by calling the action method in component objects 40A (Object Orientated Programming objects) which send instructions to the telephony hardware 20 to perform the operations. For instance, when an incoming call is detected on a telephone line the action method in a Answer Call object 42A (see FIG. 5A) is invoked, this opens a two way voice channel between the incoming caller and the telephony card 16. It can also hang up a call and close the open voice channel (Hang Up object 44A). Other functions controlled by the telephony software include inputting and outputting data on the telephony lines: using DTMF tones generated or interpreted (Get DTMF object 46A) by the telephony card 16; using the speech recognisor 19 to interpret spoken words on the line; and by outputting an audio stream (Play Audio Clip object 48A) using the voice card 18. Other functions are possible on the telephony card 16 but the embodiment will be described with the above examples since the invention is not limited to the type of function performed. The call handler 28 uses a sequence of linked component objects 40A representing the sequence of operations. The properties of each object represent how each operation should be performed. Such a sequence defines the application 34 and is assembled as self contained program code for execution as part of the call handler 28.

The application designer 32 comprises a development tool in JAVA byte code (program code) as an applet and downloadable from the web page as controlled by the internet server software 26. The application designer 32 comprises representations 40B of the component objects used in the telephony software. In the preferred embodiment the representations 40B are Object Orientated Programming objects without the method program code but including the properties (for instance icon, connections, data). Such a represented object 40B maps directly onto an actual component object 40A but the representation 40B is only a skeleton of the actual component object 40A. The application designer also comprises a graphical user interface 50 (GUI) (see FIG. 3) to pick and place icons 40C representing the component objects 40A onto a graphical workspace 51. An icon 40C so placed now represents an object component 40A having a method action to control telephony hardware 20. The properties of an object representation 40B are selected much the same as the prior art, by selecting an icon 40C representing an object representation 40B and requesting that a list of properties associated with that operation be displayed for editing purposes. Properties for that object representation 40B are added or amended using a keyboard entry and the list and object are deselected after completion. Each object representation 40B has further properties not listed which relate to the sequence in which the component object 40A's action method is called. This property is defined and represented on the GUI 50 by graphical links between icons 40C set up by selecting two icons representing the desired objects and requesting that a link between them, a graphical link is drawn on the GUI and a real connection is set up in the properties of the two objects. The icons, links and properties of the represented objects form the application design 36 which is used to build the application 34 for running by the call handler 28.

The application builder 30 assembles the application 34 based on the application design 36 sent back from the client 12. The application design 36 is sent back over the internet as string data. Syntax checking means 54 are provided to check the syntax of the application design 36 (see FIG. 5A). The application builder 30 comprises the object components 40A in class form and object creation means 52 to create objects 40A based on the classes. In this embodiment, Answer call object 42A, Play Audio Call object 44A, Get DTMF object 46A, Hang Up object 48A, and Stop object are provided in the telephony application builder 30 in class form. Property copy means 56 are provided to copy properties specified in the object representations 40B to the component objects 40A they represent. Connection forming means 58 are provided to form links between the object components. The connection forming means 58 comprises means for creating an adapter objects 80A, 80B to listen for an event from a component object and in response to the event invoking an action method on another object (see FIG. 5B). Adapter object 80A is listening for a 'done' event from the Answer Call object 42A, in response to such an event the adapter object will call the action method on the Play Audio Clip object 48A. Adapter object 80B is listening for a 'fail' event from the Answer Call object, in response to such an event the object will call the action method on the stop object. Similar adapter objects are created for the Play Audio Clip object 48A to link it to the Get DTMF Tone object 46A and the Hang Up object 44A.

Figure 2:
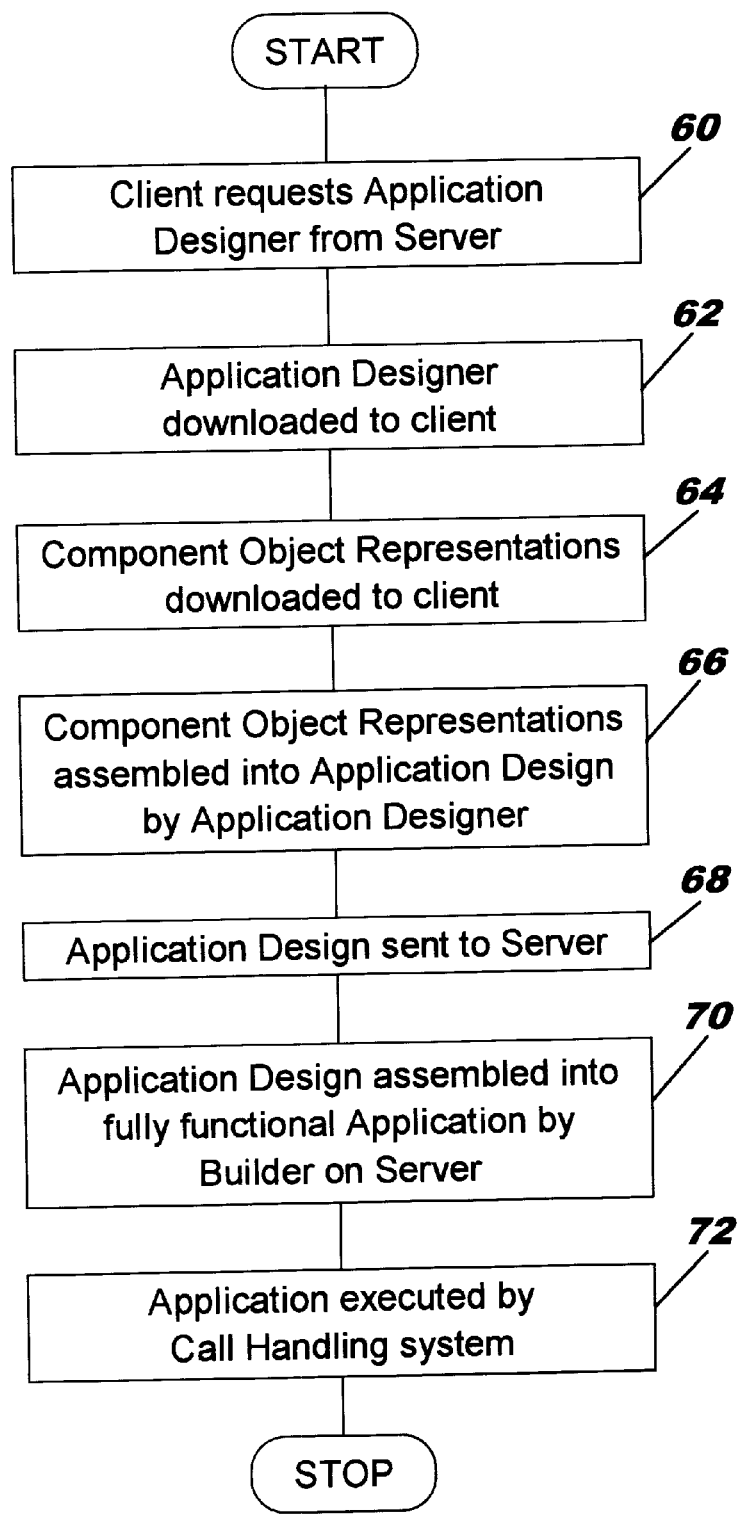
FIG. 2 is a schematic representation of the process involved in developing a telephony application.
Figure 3:
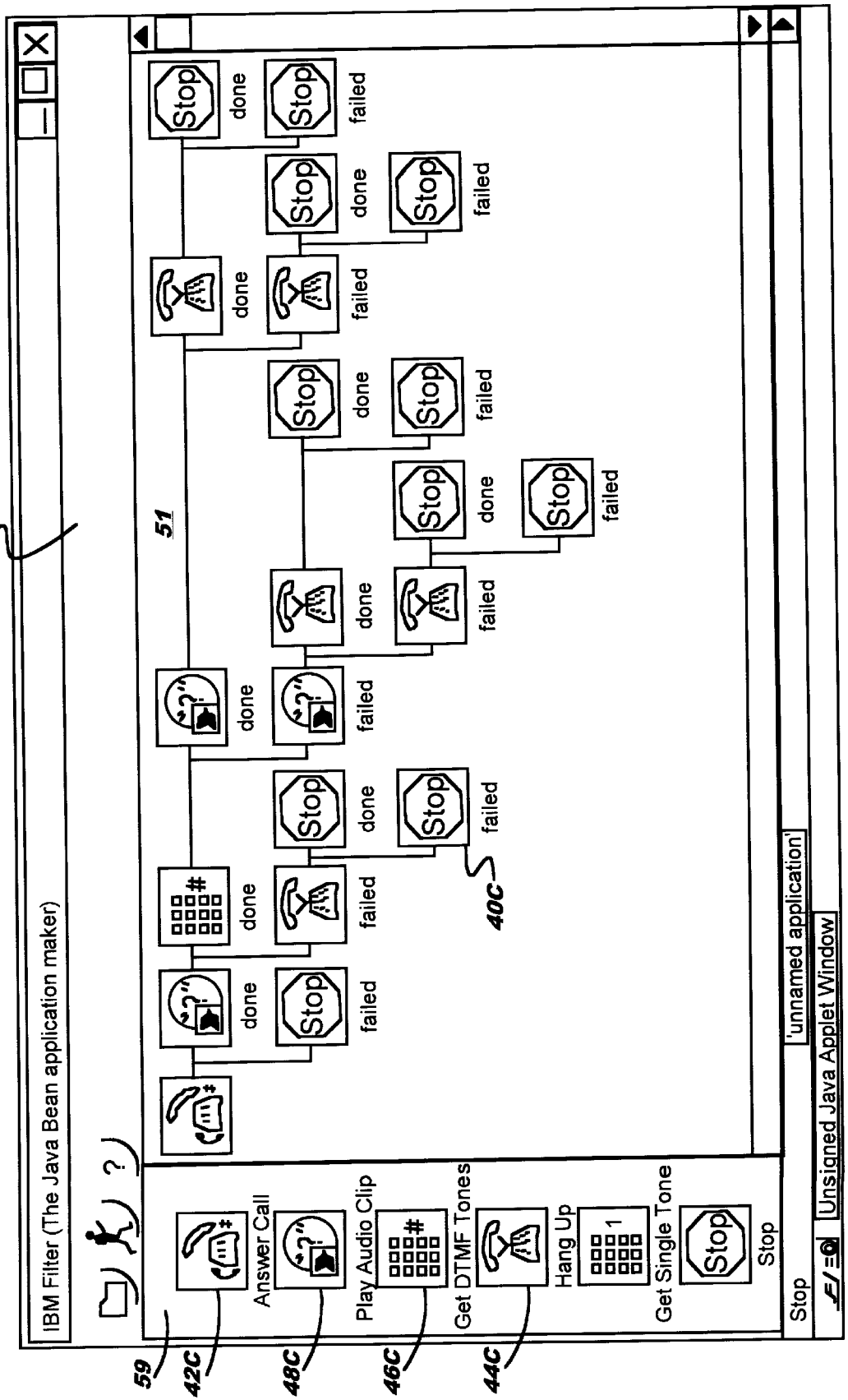
FIG. 3 is a GUI representation of a telephony application.

The operation of the embodiment is as follows (see FIG. 2). A user wishes to design a telephony application 34 on his PC 12 for a call handler 28 running on a remote server 10. The user runs the web browser 38, connects to the web page stored by the server 10 and requests 60 the application designer JAVA applet 32. In the preferred embodiment the applet code includes the code of all the object representations but an alternative embodiment may have the object representation code separate from the applet. The applet is downloaded 62 from the server 10 to the PC 12 and executed. The object representations 40B are downloaded 64 as part of the application designer 32 or as and when needed in the application design. The user then designs 66 an application 36 using the cursor and mouse to select, deselect, create and edit icons 40C. Such a design is shown in FIG. 3. A graphical palette 59 comprises Answer Call icon 42C, Play Audio Clip icon 44C, Get DTMF icon 46C, Hang Up icon 48C, Get Single tone icon 50C and a Stop icon. The user selects a Answer Call icon 42C from the palette 59, selects a position on the work space 51 and copies the Answer Call icon 42C to this position. This also creates an Answer Call object representation 42B in the application design 36. The user then selects Play Audio Clip icon 48C and positions its icon next to the Answer Call icon. This creates a Play Audio Clip object representation 48B in the application design 36. The user then selects both icons and creates a link between them thereby joining the icons graphically as in FIG. 3 and also creating a connection between the two object representations. Similarly the user selects the Get DTMF Tone icon 46C to create a Get DTMF Tone object representation 46B in the application design 36 and selects again the Play Audio Clip icon 48C to create another Play Audio Clip object representation 48B. Finally the user selects the Hang Up icon 44C and creates a Hang Up object representation 44B. Respective links are made between the objects representations 40B and icons 40C. FIG. 3 shows branches for operations which happen (done) or fail, when an operation has failed the next operation is to stop having hung up if necessary. Therefore if the call handler 28 is running an application 34 and the action method of an answer call fails, a fail event occurs. Any stop object listening for a fail event from this answer call object will be called to stop the application.

Figure 5B:
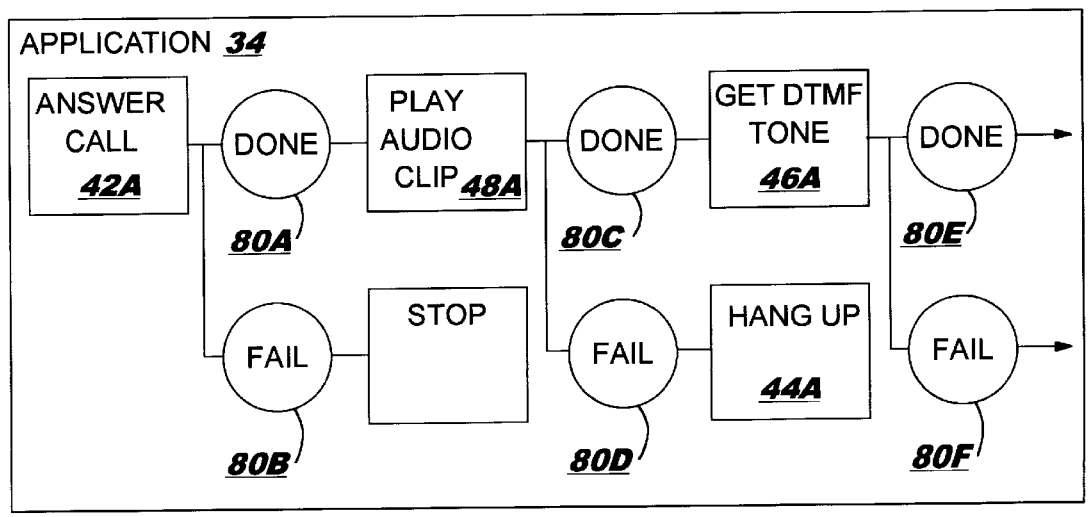
FIG. 5B is a schematic representation of an application.

The application design 36 in FIG. 3 is relatively simple to put together and is described functionally in terms of an application 34 executing on the call handler (see FIG. 3 and FIG. 5B). A call is incoming on the system and the call is answered by the Answer Call object 42A. If the call is answered, a done event is detected by adapter object 80A which passes control to a Play Audio Clip object 48A to play a welcome such as 'Hello. Please enter your personal identification number'. If the audio clip is successfully played a 'done' event is picked up by an adapter which passes control to a Get DTMF Tones object 46A which interprets and stores the tones sent by the user. If the tone is successfully acquired then an adapter object passes control to another Play Audio Clip object 48A to play a 'thank you and good-bye' message and control is passed to a Hang Up object 42A which finishes the call. A Stop object ends the execution of the application.

Examples of properties of the component objects 40A are described with respect to FIG. 4B and 4B. All objects have generic properties such as connections to other objects. Properties of the Get DTMF object 46A include (see FIG. 4A): the maximum number of tones (e.g. 10 tones), which tone terminates the tone entry (e.g. * or #), and how long before the tone entry terminates automatically if no tone is entered (e.g. 10 seconds). Properties of the Play Audio Clip object 48A include (see FIG. 4B) a name associated with some audio data for playing on the voice card (e.g. 'hello' is associated with the data for 'Hello. Please enter your personal identification number').

Such an invention may be used by a telephony service provider who wishes to allow his subscribers to write their own applications. For instance a service provider may have a multi-line capacity call handling system and several subscribers. Each subscriber could have control of a portion of the lines and could program the system using the internet with relative ease.

The invention need not necessarily be limited to telephony applications as the general principles apply to most computers applications. However, the invention is especially applicable to process applications where OOL objects are associated with real world processes. The invention is more especially applicable to telephony processes as telephony application development is particularly difficult due to the complex hardware needed.

The application designer does not need to reside on the server 10 but could reside on a different server connected to the server 10.

The network need not be the internet but could be a LAN or WAN or intranet. The connections to the network need not be TCP/IP but any network protocol. Although an IBM server and IBM operating system is described in the preferred embodiment the invention is not limited to these and any server and compatible operating system can be used. Although an IBM personal computer and IBM operating system is described in the preferred embodiment the invention is not limited to those described and any client and compatible operating system can be used. The invention is not limited to the make of internet browser used.

Now that the invention has been described by way of a preferred embodiment, various modifications and improvements will occur to those person skilled in the art. Therefore it should be understood that the preferred embodiment has been provided as an example and not as a limitation.

In summary there is described a system for remotely developing an telephony application for a call handling server comprising: program code components for each process used by the call handling server and an associated reduced code components for each process; an application designer for combining the reduced code components into an application design; networking capability for sending the application designer and reduced code components to a client and receiving a completed application design; and an application builder for assembling, according to the application design, the program code components into an self contained application

What is claimed is:

1. A system for remotely developing an application for a server comprising:

a plurality of program components, each program component comprising a functional part for execution in an application and a separable design part;

an application designer for assembling design parts of the program components into an application design;

means for sending said application designer and said plurality of said design parts to a remote client, whereby the functional parts of the program components remain on the server;

means for receiving an application design comprising assembled design parts from said client; and an application builder for compiling the program components on the server into an application based on the assembled design parts in the application design received from the client.

2. A system as claimed in claim 1 wherein the functional part of each program component is based on methods for the program component and the design part of each program component is based on properties for each program component.

3. A system as claimed in claim 2 wherein the program component is a Java Bean object.

4. A system as claimed in claim 3 wherein the application builder comprises:

syntax checking means for checking the syntax of the application design;

object creation means are provided to create objects based on respective program components;

property copy means to copy properties specified in the design part of the program components to the objects they represent; and connection forming means to form links between the created objects.

5. A system as claimed in claim 4 wherein the connection forming means comprises:

means for creating an adapter object associated with two objects and having response means whereby in response to an event from one of said component objects said adapter object calls the action method of the other object.

6. A system as claimed in claim 5 wherein the receiving means receives the application design in string form.

7. A method of developing an application for a server comprising the steps of:

sending, from the server to a remote client, an application designer and a plurality of design parts;

designing, at the client using the application designer, an application design comprising a combination of said design parts;

sending the application design from the client to the server;

building, at the server, an application comprising functional parts, stored at the server, according to the combination of design parts in the received application design.

8. A system for remotely developing a telephony application for a call handling server comprising:

a plurality of program code components and an associated plurality of reduced code design components for processes used by the call handling server, the functional part of the program code components being separable from the design components;

an application designer for combining the design components into an application design;

networking capability for sending the application designer and design components to a client and receiving back a application design of combined design components; and an application builder for assembling, according to the combined designed components in the application design, the program code components into a self contained application.

9. A method of developing a telephony application for a call handling system comprising the steps of:

storing at a server a plurality of functional components, each functional component being associated with a separable design component;

sending, from the server across a network to a remote client, a telephony application designer and said plurality of design components;

designing, at the client using the telephony application designer, a telephony application design comprising a combination of design components;

sending the telephony application design from the client across the network to the telephony server;

building, at the telephony server, a telephony application comprising the functional components based on the design components in the telephony application design.

\* \* \* \* \*